Patented Apr. 28, 1953

2,636,902

UNITED STATES PATENT OFFICE 2,636,902

PRODUCTION OF AMINES

Arthur William Charles Taylor, Phineas Davies, and Peter William Reynolds, Norton-on-Tees, England, assignors to Imperial Chemical Industries Limited, a corporation of Great Britain No Drawing. Application December 8, 1949, Serial No. 131,917. In Great Britain January 7, 1949

8 Claims. (Cl. 260—585)

This invention relates to a process of amination.

It is known to produce aliphatic amines by continuously reacting an open chain primary or secondary aliphatic alcohol containing from 2 to 8 carbon atoms in the molecule in the vapour phase in the presence of hydrogen at a temperature between 150° and 230° C. in the presence of a metallic hydrogenation catalyst, for example metallic nickel or cobalt. We have now found that conversion and yields of desired product can be increased by using a foraminate catalyst comprising nickel, cobalt or iron, as hereinafter defined, which has been treated with a basic alkaline earth metal compound.

According to the present invention there is provided a process for the production of amines which comprises reacting a saturated aliphatic primary alcohol containing from 2 to 13 carbon atoms in the molecule or the corresponding aldehyde, or a saturated aliphatic secondary alcohol containing from 2 to 13 carbon atoms in the molecule or the corresponding ketone, or cyclohexanol and its homologues, or the corresponding ketones, containing up to 13 carbon atoms in the molecule or tetrahydrofurfuryl alcohol or tetrahydrofurfural with ammonia and hydrogen at a temperature within the range 140° to 230° C. and under a pressure of at least 10 atmospheres gauge in the presence of a foraminate hydrogenating metal catalyst selected from group VIII of the periodic systems especially nickel or cobalt, which has been treated with a basic soluble alkaline earth metal compound. According to the invention mono-, di- or tri-amines may be produced.

Pressures of 250 atmospheres and more may be employed, but it is preferred on the grounds of simplicity and convenience, and because of the good conversions and yields, to operate in the range of from 10 to 25 atmospheres gauge.

According to the process of the invention, for example, the ethylamines, n-propylamines, n-butylamines and the nonylamines, may be produced from ethanol, n-propanol, n-butanol and nonanol (e. g. 3,5,5-trimethyl hexanol) respectively, or from the corresponding aldehydes. In similar manner the iso-propylamines, isobutylamines, cyclohexylamines, methylcyclohexylamines and dimethylcyclohexylamines, respectively, may be produced from isopropanol isobutanol, cyclohexanol, methylcyclohexanol and dimethylcyclohexanol, or from acetone, ethyl methyl ketone, cyclohexanone, methylcyclohexanone and dimethylcyclohexanone respectively. Tetrahydrofurfurylamine may be produced from tetrahydrofurfuryl alcohol or tetrahydrofurfural in similar manner. The process of the invention gives particularly valuable results with ethanol.

The molar ratio of hydrogen to alcohol, or other starting material, is selected to give good operating conditions and although it may be within the range 1:10 to 100:1, will in general lie within the range 1:1 to 10:1, and preferably within the range 2:1 to 4:1. The molar ratio of ammonia to alcohol preferably lies within the range from 1:1 to 10:1. It is desirable that the molar ratios of hydrogen and ammonia respectively to the oxygenated reactant be at least 1:2. Speaking generally, direction of the reaction to the production of the monamines as the major product can be achieved by increasing the proportion of ammonia to at least 4 moles per mole of alcohol or other compound and to a lesser degree by increasing the proportion of hydrogen.

By the term "foraminate catalyst" as used in this specification is meant one comprising particles or pieces, for example granules prepared by crushing, of an alloy comprising the desired catalytically active metal or metals together with one or more other metals more soluble in acid or alkali or other extracting liquid than the desired catalytically active metal or metals, said alloy comprising at least one phase in which atoms of the desired catalytically active metal or metals and of the aforesaid more soluble metal or metals are on the same crystal lattice and said particles or pieces having a robust core of alloy and an outer active layer having a skeletal structure resulting from the partial or complete removal by the extracting liquid of the more soluble metal or metals from the aforesaid phase or phases in said outer layer. The particles or pieces may be prepared in various ways, for example by crushing the cool alloy, and may be of various sizes, but are preferably ⅛" to ¼".

Foraminate nickel/aluminium, nickel/silicon, cobalt/aluminium, and cobalt/silicon, are all suitable for use in the process of the invention. These catalysts may be prepared by the extraction with aqueous alkali, e. g. caustic soda, of alloys having the following compositions: nickel/aluminium alloys having a weight ratio of Ni:Al of from 30:70 to 62:38, preferably from 30:70 to 50:50; nickel/silicon alloys having a weight ratio of Ni:Si of from 30:70 to 85:15, preferably from 40:60 to 70:30; cobalt/aluminium alloys having a weight ratio of Co:Al of from 15:85 to 55:45, preferably from 30:70 to 50:50;

and cobalt/silicon alloys having a weight ratio of Co:Si of from 30:70 to 85:15. Aqueous caustic soda solutions of 0.1 to 10% strength by weight are very suitable for use as extracting solutions, although stronger solutions may be used if desired. In the case of aluminium alloys up to 70% by weight of the aluminium originally present may be extracted, and in the case of the silicon alloys up to 50% of the silicon likewise. In activating the catalyst it is desirable for best results to extract at least 20% of the extractible metal. Foraminate iron catalysts may also be employed.

While these catalysts can be used within the aforesaid range of temperature it is preferred to operate within the range of from 140°–190° C. for cobalt, and at 170°–220° C. for nickel catalysts. Catalysts which have been in use for some time generally give better results if used at temperatures a little higher than when first prepared.

The process may be conducted in the vapour phase or in the liquid phase, and may be batch or continuous. It is preferred to operate continuously at a temperature within the range 140°–220° C. under a pressure of 10 to 25 atmospheres gauge. Under these conditions a suitable space velocity is from 0.1 to 0.5 litre of liquid alcohol or other compound fed per litre of bulk catalyst volume per hour. Operating thus conversions and yields in excess of 90% are commonly achieved with the lower normal alkyl alcohols. With $C_2$ to $C_9$ aliphatic alcohols, aldehydes or ketones, operation may advantageously be in the vapour phase, with compounds having a higher boiling point than the $C_9$ aliphatic alcohols operation will generally be in the liquid phase.

Preferably the activated catalyst is treated before use with a soluble alkaline earth basic compound, especially barium hyroxide, for example as a warm 10% solution. The catalyst is preferably well impregnated with the alkaline earth compound, which can be achieved by soaking it in the treating solution for a number of hours, e. g. 10. While it is preferred to employ barium hydroxide, calcium and strontium hydroxides may also be used. Other alkaline earth metal compounds capable of being dissolved in a solvent having no deleterious effect on the catalyst, and not causing further aluminium extraction to a substantial extent, and not contaminating the catalyst with undesirable anions such as chloride or sulphate may be used. If desired the activated catalyst may be impregnated by continuously passing the solution over the catalyst. The advantage connected with the alkaline earth compound treatment is that any dehydrating effect associated with the foraminate catalyst is neutralised or substantially reduced. This applies especially to catalysts prepared from aluminium alloys, which almost always contain some alumina remaining after caustic extraction. In this way dehydration of oxygenated starting material to olefine can be very much reduced or even substantially eliminated.

Water may or may not be present in the reaction mixture.

In this specification "pass conversion" means the total proportion of the specified alcohol or other starting material consumed per pass expressed as a percentage; and yield, the amount of useful products expressed as a percentage of that theoretically obtainable from the alcohol or other starting material consumed.

The following examples illustrate the manner in which the invention is to be performed. Parts are by weight unless otherwise stated.

Example 1

100 parts of ethyl alcohol/tri-ethylamine water azeotrope in which the components were present in the proportions 93.5%, 1.0% and 5.5% respectively, was passed at a liquid space velocity of 0.22 litre/litre of bulk catalyst volume/hour together with 31.1 parts of ammonia and 7.2 parts of hydrogen over a foraminate nickel/aluminium catalyst which had been treated with barium hydroxide, the reaction temperature and pressure being 195° C. and 250 lbs. per sq. in. respectively. The foraminate nickel/aluminium catalyst, which graded between ⅛″ and ¼″ aperture meshes, was prepared by extracting pieces of a nickel/aluminium alloy containing 42% Ni and 58% Al with 0.2–0.4% aqueous caustic soda to remove at least 20% of the aluminium washing to remove substantially all soluble salts from the catalyst granules and then treating them with barium hydroxide solution, for which purpose the catalyst was allowed to stand for, say, at least 12 hours in sufficient of a 5% solution of barium hydroxide octahydrate to just cover the granules, and thereafter draining off the solution without washing the granules.

The condensed product comprised:

| | Parts by weight |
|---|---|
| Mono-ethylamine | 10.6 |
| Di-ethylamine | 36.5 |
| Tri-ethylamine | 18.4 |
| Alcohol | 5.5 |
| Water | 39.9 |

The conversion of ethyl alcohol was 94%, and the yield of mixed ethylamines based on this conversion was 91.5%.

By contrast with this, when 100 parts of the samesame azeotrope was passed at a liquid space belocity of 0.26 litre/litre of bulk catalyst volume/hour together with 72.5 parts of ammonia and 22.6 parts of hydrogen over the same catalyst in unpromoted condition and under the same conditions of temperature and pressure the conversion of ethyl alcohol was 70% and the yield of mixed ethylamines was 75%. The product comprised:

| | Parts by weight |
|---|---|
| Mono-ethylamine | 22.1 |
| Di-ethylamine | 16.1 |
| Tri-ethylamine | 6.1 |
| Ethyl alcohol | 28.1 |
| Water | 31.1 |

Example 2

100 parts of n-propanol was passed at a liquid space velocity of 0.25 litre/litre of bulk catalyst volume/hour together with 33.2 parts of ammonia and 6.65 parts of hydrogen over the same barium hydroxide promoted catalyst and otherwise under the same conditions as described in Example 1.

The liquid product comprised:

| | Parts by weight |
|---|---|
| Mono-n-propylamine | 24.3 |
| Di-n-propylamine | 42.6 |
| Tri-n-propylamine | 12.0 |
| n-Propanol | 5.4 |
| Water | 28.4 |

The conversion of n-propyl alcohol was 95% and the yield of n-propylamines based on this conversion was 95.5%.

Example 3

Iso-propanol together with hydrogen in a proportion of 2.5 moles, and ammonia in a proportion of 1.18 moles, per mole of iso-propanol was passed over the same catalyst as was used in Example 2, at 195° C. under 17 atmospheres gauge at a space velocity of 0.2 similarly calculated.

The liquid product had the percentage composition by volume:

| | |
|---|---|
| Mono-iso-propylamine | 37 |
| Di-iso-propylamine | 33 |
| Tri-iso-propylamine | -- |
| Iso-propanol | 12 |
| Water | 18 |

The conversion was 86% and the yield 96%, based on iso-propanol.

Example 4

Iso-butanol, together with hydrogen in a proportion of 2.5 moles, and ammonia in a proportion of 1.25 moles, per mole of iso-butanol, was passed over the same catalyst as was used in Example 2 at 190° C. under 17 atmospheres gauge at a space velocity of 0.2 similarly calculated.

The liquid product had the percentage composition by volume:

| | |
|---|---|
| Mono-iso-butylamine | 23 |
| Di-iso-butylamine | 47 |
| Tri-iso-butylamine | 1 |
| Iso-butanol | 11 |
| Water | 18 |

The conversion was 87% and the yield 97%, based on iso-butanol.

Example 5 n-Butanol together with hydrogen in a proportion of 2.5 moles, and ammonia in a proportion of 1.25 moles, per mole of butanol was passed over the same foraminate catalyst as was used in Example 2, at 190° C. under 17 atmospheres gauge at a liquid space velocity of 0.2 similarly calculated.

The liquid product had the percentage composition by volume:

| | |
|---|---|
| Mono-n-butylamine | 15 |
| Di-n-butylamine | 49 |
| Tri-n-butylamine | 16 |
| n-Butanol | 2 |
| Water | 18 |

The conversion was 98% and the yield 98%, based on n-butanol.

Example 6

Sec-butanol, together with hydrogen in a proportion of 2.5 moles, and ammonia in a proportion of 1.25 moles, per mole of sec-butanol was passed over the same catalyst as was used in Example 2 at 190° C. under 17 atmospheres gauge at a liquid space velocity of 0.2 similarly calculated.

The liquid product had the percentage composition by volume:

| | |
|---|---|
| Mono-sec-butylamine | 56 |
| Di-sec-butylamine | 13 |
| Tri-sec-butylamine | 1 |
| Sec-butanol | 15 |
| Water | 15 |

The conversion was 82% and the yield 96%, based on sec-butanol.

Example 7

3,5,5-trimethyl-hexanol together with hydrogen in a proportion of 2.0 moles, and ammonia in a proportion of 4.2 moles, per mole of 3,5,5-trimethyl-hexanol was passed over the same catalyst as was used in Example 2 at 200° C. under 17 atmospheres gauge at a liquid space velocity of 0.15 similarly calculated.

The liquid product had the percentage composition by volume:

| | |
|---|---|
| Mono (3,5,5-trimethyl-hexyl) amine | 15 |
| Di (3,5,5-trimethyl-hexyl) amine | 34 |
| Tri (3,5,5-trimethyl hexyl) amine | -- |
| 3,5,5-trimethyl-hexanol | 10 |
| Water | 10 |

The total conversion was 90% and the yield 70%, based on 3,5,5-trimethyl-hexanol.

Example 8

Cyclohexanol together with hydrogen in a proportion of 2.0 moles, and ammonia in a proportion of 4.8 moles, per mole of cyclohexanol was passed over the same catalyst as was used in Example 2 at 200° C. under 17 atmospheres gauge at a liquid space velocity of 0.25 similarly calculated.

The liquid product had the percentage composition by volume:

| | |
|---|---|
| Mono-cyclohexylamine | 80 |
| Di-cyclohexylamine | 2 |
| Tri-cyclohexylamine | -- |
| Cyclohexanol | 2 |
| Water | 16 |

The conversion was 94% and the yield 94%, based on cyclohexanol.

Example 9

The process of Example 8 was repeated employing molar ratios of hydrogen and ammonia to cyclohexanol of 2:1 and 1.5:1 respectively, a temperature of 200° C., 17 atmospheres gauge, a space velocity similarly expressed of 0.25, and the same catalyst.

The liquid product had the percentage composition by volume:

| | |
|---|---|
| Mono-cyclohexylamine | 41 |
| Di-cyclohexylamine | 36 |
| Tri-cyclohexylamine | 2 |
| Cyclohexanol | 5 |
| Water | 16 |

The conversion was 94% and the yield 94%, based on cyclohexanol.

Example 10

Tetrahydrofurfuryl alcohol together with 2.0 moles of hydrogen, and 4.6 moles of ammonia, per mole of tetrahydrofurfuryl alcohol was passed over the same catalyst as was used in Example 2 at 210° C. under a pressure of 17 atmospheres gauge and at a space velocity of 0.15 similarly expressed.

The liquid product had the percentage composition by volume:

| | |
|---|---|
| Mono-tetrahydrofurfurylamine | 40 |
| Di-tetrahydrofurfurylamine | 4 |
| Tri-tetrahydrofurfurylamine | 13 |
| Tetrahydrofurfurylalcohol | 23 |
| Water | 20 |

The conversion was 73% and the yield 80%, based on tetrahydrofurfuryl alcohol.

We claim:

1. A process for the production of amines which comprises reacting an aliphatic mono-alcohol having from 2 to 13 carbon atoms in the molecule with ammonia and hydrogen at a temperature within the range 140° to 230° C. and under a pressure of from 10 to 25 atmospheres gauge in the presence of a foraminate hydrogenating metal catalyst selected from group VIII of the periodic system which has been treated with a soluble alkaline earth metal basic compound.

2. A process for the production of amines as set forth in claim 1 wherein the catalyst is a foraminate nickel-aluminum catalyst prepared from an alloy in which the weight ratio Ni:Al is from 30:70 to 62:38.

3. A process for the production of amines as set forth in claim 1 wherein the catalyst is a foraminate cobalt-aluminum catalyst prepared from an alloy in which the weight ratio Co:Al is from 15:85 to 55:45.

4. A process for the production of amines as set forth in claim 1 wherein the alkaline earth metal basic compound is barium hydroxide.

5. A process for the production of amines as set forth in claim 1 wherein the molar ratio of ammonia to aliphatic mono-alcohol containing from 2 to 13 carbon atoms is at least 4:1.

6. A process for the production of amines which comprises reacting an aliphatic mono-alcohol having from 2 to 13 carbon atoms in the molecule with ammonia and hydrogen at a temperature within the range 170° to 220° C. and under a pressure of from 10 to 25 atmospheres gauge in the presence of a foraminate nickel-aluminum catalyst which has been treated with a soluble alkaline earth metal basic compound.

7. A process for the production of amines which comprises reacting an aliphatic mono-alcohol containing from 2 to 13 carbon atoms in the molecule with ammonia and hydrogen at a temperature within the range 140° to 190° C. and under a pressure of from 10 to 25 atmospheres gauge in the presence of a foraminate cobalt-aluminum catalyst which has been treated with a soluble alkaline earth metal basic compound.

8. A continuous process for the production of amines which comprises passing in the vapor phase over a catalyst an aliphatic mono-alcohol containing from 2 to 9 carbon atoms in the molecule together with ammonia and hydrogen at a temperature within the range 170 to 220° C. and at a pressure of from 10 to 25 atmospheres gauge and at a liquid space velocity of from 0.1 to 0.5 litre of aliphatic mono-alcohol per litre of bulk catalyst volume per hour, said catalyst comprising a foraminate nickel-aluminum catalyst promoted with a soluble alkaline earth metal basic compound.

ARTHUR WILLIAM CHARLES TAYLOR.
PHINEAS DAVIES.
PETER WILLIAM REYNOLDS.

References Cited in the file of this patent

UNITED STATES PATENTS

| Number | Name | Date |
|---|---|---|
| 1,875,747 | Martin et al. | Sept. 6, 1932 |
| 2,166,971 | Schmidt et al. | July 25, 1939 |

FOREIGN PATENTS

| Number | Country | Date |
|---|---|---|
| 422,563 | Great Britain | Jan. 10, 1935 |